United States Patent
Chazottes et al.

(10) Patent No.: US 8,948,938 B2
(45) Date of Patent: Feb. 3, 2015

(54) FULLY PARAMETRIZABLE ELECTRONIC ALERTS AND PROCEDURES MANAGEMENT SYSTEM, INTENDED FOR AN AIRCRAFT

(71) Applicant: Thales, Neuilly sur Seine (FR)

(72) Inventors: Xavier Chazottes, Toulouse (FR); Stéphane Bertheau, Toulouse (FR); Michel Mazenoux, Valence (FR)

(73) Assignee: Thales, Neuilly-sur-Seine (FR)

( * ) Notice: Subject to any disclaimer, the term of this patent is extended or adjusted under 35 U.S.C. 154(b) by 91 days.

(21) Appl. No.: 13/869,348

(22) Filed: Apr. 24, 2013

(65) Prior Publication Data
US 2013/0282207 A1    Oct. 24, 2013

(30) Foreign Application Priority Data
Apr. 24, 2012  (FR) ..................................... 12 01200

(51) Int. Cl.
  *G06F 7/70*       (2006.01)
  *B64C 19/00*      (2006.01)
  *G05D 1/08*       (2006.01)
  *G06F 17/00*      (2006.01)

(52) U.S. Cl.
  CPC .............. *B64C 19/00* (2013.01); *G05D 1/0825* (2013.01); *G06F 17/00* (2013.01)
  USPC ............. 701/14; 701/120; 701/301; 340/963; 340/945; 714/47.2; 714/48; 714/57

(58) Field of Classification Search
  CPC . G06F 9/4881; G06F 11/0781; G06F 11/327; G06F 17/246; G06F 17/30595; G06F 3/0481; G06F 3/0485; G06Q 99/00
  USPC ..................... 701/14, 120, 301; 340/963, 945
  See application file for complete search history.

(56) References Cited

U.S. PATENT DOCUMENTS

| | | | |
|---|---|---|---|
| 6,021,262 A * | 2/2000 | Cote et al. ........................ 714/48 |
| 6,275,767 B1 * | 8/2001 | Delseny et al. ................ 701/120 |
| 2005/0216504 A1 * | 9/2005 | Delvat et al. .............. 707/103 R |
| 2010/0066565 A1 * | 3/2010 | Francois et al. .............. 340/963 |
| 2013/0282207 A1 * | 10/2013 | Chazottes et al. .............. 701/14 |

FOREIGN PATENT DOCUMENTS

| | | |
|---|---|---|
| FR | 2787269 A1 | 6/2000 |
| FR | 2935818 A1 | 3/2010 |

OTHER PUBLICATIONS (Kiyofumi Tanaka), Real-Time Operating System Kernel for Multithreaded Processor (International Workshop on Innovative Architecture for Future Generation High Performance Processors and Systems) Jan. 1, 2006, pp. 91-100, XP031044044, ISBN: 978-0-7695-2689-8.

* cited by examiner

*Primary Examiner* — Redhwan k Mawari
(74) *Attorney, Agent, or Firm* — Baker & Hostetler LLP

(57) ABSTRACT

An alerts and procedures management system for an aircraft comprises a software kernel aboard the aircraft and a parameterization tool for the software kernel, which comprises a conversion module for converting a configuration file describing an operational need of the system into a database of binary parameters which is able to parameterize the software kernel. The software kernel comprises at least four elementary cells: a first cell for acquiring aircraft signals, a second cell for characterizing state variables of the aircraft, a third cell for computing at least one separate event, a fourth cell for scheduling the separate events for communication with the crew; each of the cells comprising a software engine parameterizable by the database.

7 Claims, 3 Drawing Sheets

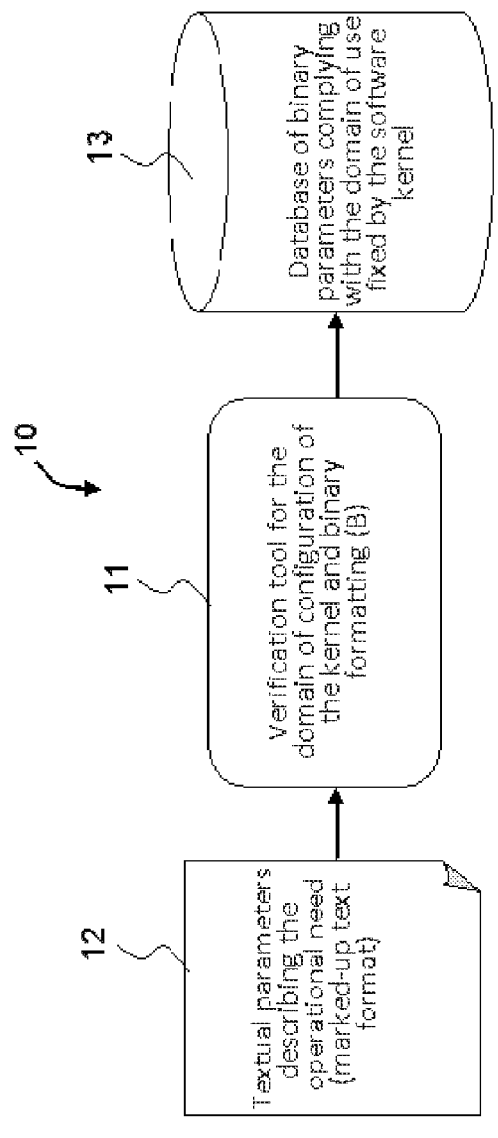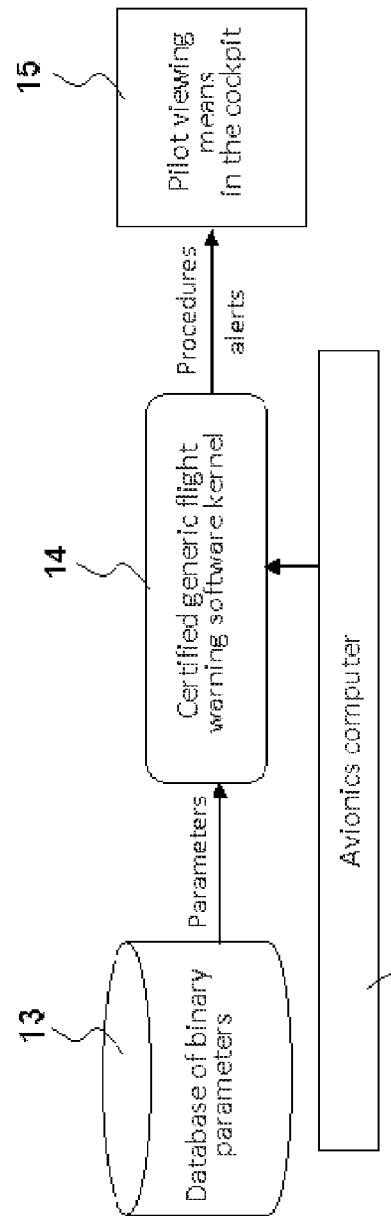

FULLY PARAMETRIZABLE ELECTRONIC ALERTS AND PROCEDURES MANAGEMENT SYSTEM, INTENDED FOR AN AIRCRAFT

CROSS-REFERENCE TO RELATED APPLICATION

This application claims priority to foreign French patent application No. FR 1201200, filed on Apr. 24, 2012, the disclosure of which is incorporated by reference in its entirety.

FIELD OF THE INVENTION

The present invention belongs to the field of flight management systems onboard aircraft. More precisely, it applies to onboard alerts management systems which collect signals from the aircraft, establish alerts, list and manage the state of the procedures to be applied by the crew and organize the communication with the said crew.

BACKGROUND

A centralized in-flight alerts system, FWS (for Flight Warning System), constitutes an advance with respect to sub-system based alerts reports which did not allow the crew to have an overall view should several alerts arise concomitantly. On the other hand, the development and maintenance of such systems are complex and expensive since they depend not only on the technical specifications of aircraft equipment but still more on the operational procedures defined by aircraft manufacturers and specialized by operators. It is therefore important to be able to easily modify the configuration of an alerts and procedures management system on the one hand, for one and the same model of aircraft, as a function of the order of the airline that operates it, or for one and the same airline over time in tandem with changes in regulations and feedback from experience, and on the other hand, for several models of aircrafts, when these latter exhibit a considerable common share in the components, the sub-systems or else the operational needs of the operator. These conditions are not fulfilled by the alerts and procedures management systems of the prior art which exhibit the characteristic of being developed, having regard to the certification constraints, as a monolithic sequential code. Lengthy design and validations, carried out at the end of an aircraft's development cycle, are necessary in order to integrate the developments of the aircraft's other sub-systems into the alert system; regular software updates must be organized during development and in a subsequent phase of commercial operation of the aircraft.

To solve this problem, the general idea of the invention is to structure the alerts and procedures management system by isolating on the one hand a generic software kernel which constitutes an invariant part and which is certified, and on the other hand a configurable variable part so as to make it possible to adapt the alert system to changes in the operational needs of the aircraft, during development or during operation.

An alerts management system, of which a module for scheduling tasks is modifiable by means of a configuration table, is also known from the patent application filed by the applicant under publication No. FR2935818. The document thus proposes to factorize a part of the software code of the alerts management system, by rendering parameterizable a module for scheduling tasks. Nevertheless, a significant part of the alerts management system remains to be developed in the form of a monolithic sequential code; the proposed architecture does not make it possible to dispense with software development time and certification time.

SUMMARY OF THE INVENTION

The invention proposes to solve this problem and, for this purpose, the subject of the invention is an alerts and procedures management system intended for an aircraft comprising a software kernel aboard the aircraft and a parameterization tool for the software kernel, characterized in that the parameterization tool comprises a conversion module, for converting a configuration file describing an operational need of the alerts and procedures management system into a database of binary parameters which is able to parameterize the software kernel. The software kernel comprises at least four elementary cells:
 a first cell for acquiring and consolidating a set of aircraft signals,
 a second cell for characterizing a set of state variables of the aircraft, generated on the basis of the aircraft signals;
 a third cell for computing at least one separate event, comprising at least one alert or one procedure, generated on the basis of the consolidated aircraft signals and/or of the state variables;
 a fourth cell for scheduling the separate events for communication with the crew;
each of the cells comprising a software engine parameterizable by the database of binary parameters.

Advantageously, the configuration file describes an operational need by a set of parameters which is structured in accordance with a predetermined configuration domain, the said configuration domain consisting of separate tasks, comprising at least one alert or one procedure, each separate task being described by values of parameters in a predetermined list comprising at least one parameter of the following type: alert, alert sound, flight phase, triggering event, aircraft signal, context, procedure, content of a procedure, item or menu; a permitted range of values being associated with each parameter.

Advantageously, the parameterization tool converts a configuration file coded in the XML language and complying with the configuration domain into a database of binary parameters which is able to parameterize each of the elementary cells of the software kernel.

Advantageously, the software engines of the four elementary cells are validated separately; the validation of a sequencing between the cells being facilitated by interfaces between boolean type cells, limiting the combinatorics of cells assemblage tests, independently of the parameterization.

The invention also pertains to a method for parameterizing an alerts and procedures management system intended for an aircraft having the characteristics described above, characterized in that it comprises a first step of verifying the configuration domain of a configuration file representative of an operational need of the said alerts and procedures management system, and a second step of converting the configuration file into a database of binary parameters which is able to parameterize a generic alerts and procedures management system which is validated for the said configuration domain.

The invention also pertains to a method for developing an alerts and procedures management system intended for an aircraft having the characteristics described above, characterized in that it comprises a step of defining a configuration domain for tasks to be executed, the said configuration domain being able by parameterization to cover a wide spectrum of operational needs of the alerts and procedures management system, a step of programming the software engines of each of the elementary cells, and a step of parameterizing the logic for executing the tasks of each of the elementary cells.

The invention pertains finally to a method for maintaining an alerts and procedures management system intended for an aircraft having the characteristics described above, characterized in that it comprises a step of converting a configuration file describing an operational need of the alerts and procedures management system into a binary parameter database, and a step of parameterizing the alerts and procedures management system by the database of binary parameters produced during a maintenance operation on the aircraft.

BRIEF DESCRIPTION OF THE DRAWINGS

The invention will be better understood and other advantages will become apparent on reading the detailed description of the embodiments given by way of example in the following figures:

FIGS. 2a and 2b represent an exemplary simplified functional architecture of an alerts and procedures management system according to the invention;

DETAILED DESCRIPTION

For the sake of clarity, the same elements will bear the same labels in the various figures.

Unless stated otherwise, in the description and the figures, the initials, acronyms and abbreviations have the meaning indicated in the table hereinbelow.

| Initials/Abbreviation | Meaning |
| --- | --- |
| A/C | Aircraft |
| ARINC 664p7 | Avionics Network |
| AMS | Avionics Management System |
| ARINC | Aeronautical Radio, Inc. |
| BITE | Built-In Equipment Test |
| C/W | Caution and Warning System |
| CAS | Crew Alert System |
| CKL | Check List or procedures |
| CDS | Cockpit Display System |
| CASDB | Crew Alert System Database |
| CKLDB | Check List Database |
| SYSDB | System Database |
| CMF/CMS | Communication Management Function/System |
| CSCI | Computer Software Configuration Item |
| DCA | Data Concentration Application |
| DFFWS | Definition File of the FWS |
| ECP | Engine & Display Control Panel of the FWS |
| EWD | Engine & Warning Display |
| FWA | Flight Warning Application |
| FWS | Flight Warning System |
| HMI/MMI | Human Machine Interface or Man Machine Interface |
| IMA | Integrated Modular Avionics |
| MWC | Master Warning Caution |
| NVM | Non Volatile Memory |
| INOP SYS | Inoperative System |
| T2CAS | Terrain and Traffic Collision Avoidance System |
| TFTP | Trivial File Transfer Protocol |
| WXR | Weather Radar system |
| XML | eXtensible Mark-up Language |

Figure 1:
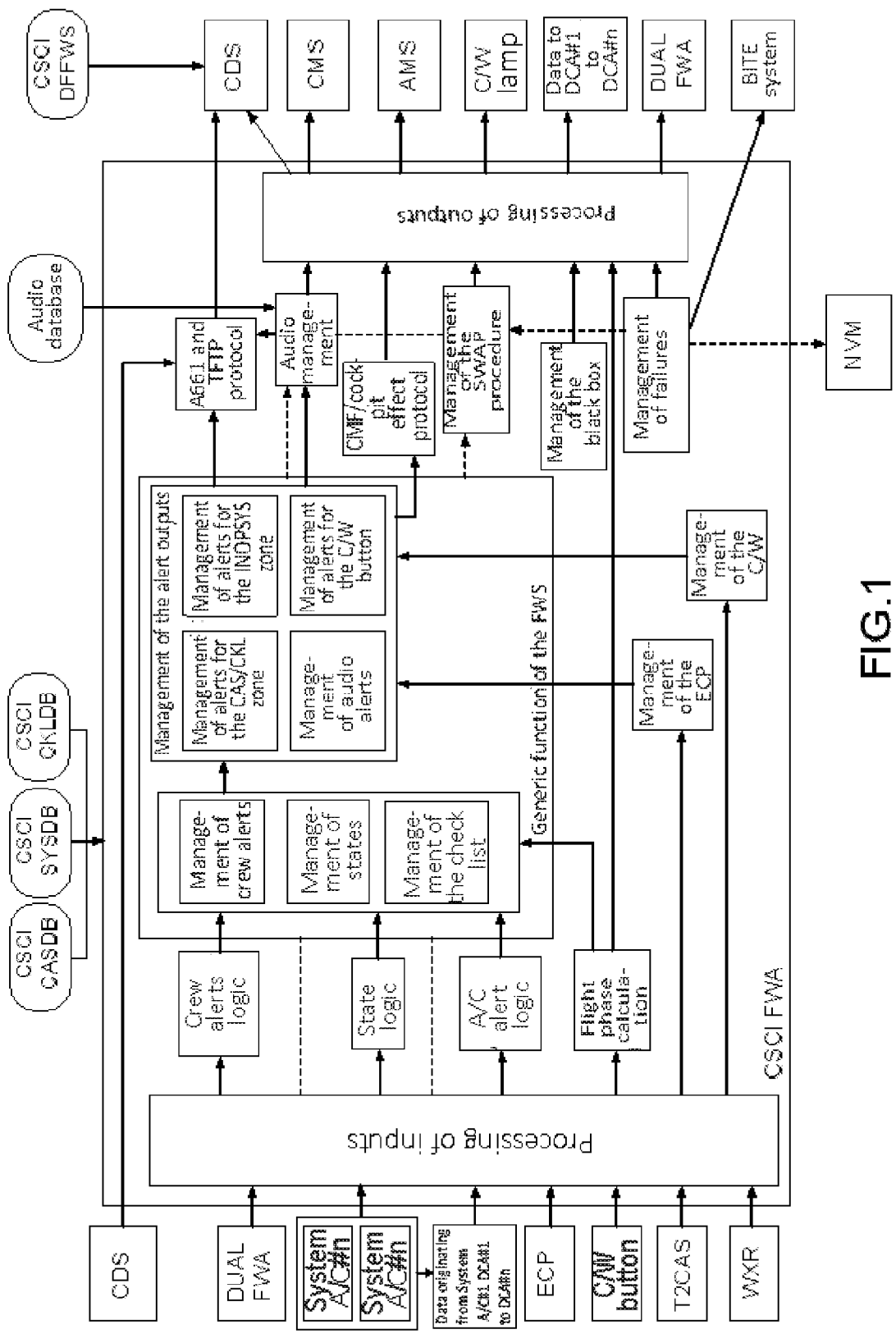
FIG. 1 represents the relationships of an alerts and procedures management system with the other onboard systems.

FIG. 1 represents the relationships of an alerts and procedures management system with the other onboard systems.

The FWS system is embedded in redundant mode on two computers of the IMA architecture (integrated modular avionics, that can be embedded on a computer), the consistency of whose outputs is verified at each computation step. Each FWS/FWA computer therefore has as input those of the dual computer in the corresponding step and also dispatches its results to it. Furthermore, the FWS receives as input the NC data (i.e.: the discretes uploaded from the onboard computers used to detect the failures of a linked piece of electronic equipment) and the DCA data on n channels (making it possible to inter-correlate the faults). Finally, four systems advantageously dispatch their outputs to the FWS computer:

the outputs of the control panel of the aircraft's electronics centralized monitor sub-system (ECP) which upload the pilot actions (item acknowledgement, movement through the check-list, access to the system pages and to the lists of procedures);

the states of the notification and alert button C/W at the output of the FWS system;

the outputs of the T2CAS terrain and aircraft anticollision system; this system manages the positioning of the aircraft with respect to the relief and with respect to the trajectories of the various other aircraft detected and dispatches alerts to the FWS system in case of collision trajectory;

the outputs of the WXR weather radar system; these outputs make it possible to trigger alerts regarding very severe weather.

These data are conditioned for use by the FWS system (Function "Processing of the inputs"). In the known systems, crew alert logic and NC states and alert management logic are implemented to process the input data, the processed data being provided to the FWS generic function core. The logic facilities in respect of crew alerts are dedicated to the triggering of the current alerts specific to a given piece of equipment. During the effecting of a check-list (triggered by the first type of logic), the state logic induces a status check-list. The NC alerts logic facilities are identical to the first type of logic, but are generic to a set of computers and not to a single computer. The parameters of the flight phase in progress are also provided to the FWS core.

In the known systems, the FWS core is partitioned into three management functions (crew alerts, states and check-list) and four functions for managing the alerts at output (CAS/CKL area managing the triggered alerts and inducing a check-list procedure, INOP SYS managing the alerts which are triggered and filtered and inducing neither alert nor procedure—only the INOP SYS telltale light will be seen by the crew, audio alerts, C/W button alerts). The audio alerts are selected from a database of audio messages envisaged for this purpose. The visual alerts are displayed on the screens envisaged for this purpose in the cockpit and the flight deck. The Arinc 661 and TFTP protocols make it possible to communicate with the CDS (Cockpit Display System)). The CMF protocol makes it possible to dispatch the fault data to the centralized maintenance system, to trace all the anomalies detected during flight.

FIGS. 2a and 2b represent an exemplary simplified functional architecture of an alerts and procedures management system according to the invention. In particular, FIG. 2a describes a parameterization tool 10 comprising a verification and conversion module 11 for converting a configuration file 12 into a database of binary parameters 13. FIG. 2b describes a generic software kernel 14, parameterizable by means of a database of binary parameters 13, and able to organize the communication of alerts and procedures with the crew, by means of a man machine interface (MMI) 15 placed in the cockpit of the aircraft. The generic software kernel 14 constitutes the FWS system aboard the aircraft, embedded in redundant mode on the computers 16 of the IMA architecture. In this way it receives a set of outside signals The alerts and procedures management system according to the invention is structured into two distinct subsets, an onboard generic software kernel 14 aboard the aircraft and a parameterization tool 10 for the generic software kernel 14. The aim of this structure is to rationalize the developments between a stable software part which forms the subject of a certification in accordance with the certification requirements in force, and notably the DO178C standard for the "avionics software code" category, and a parameterizable part dependent on the aircraft manufacturer's or operator's variable specifications, and also subject to the DO178C standard for the "parameter file" category. An FWS system according to the invention can thus be updated during a maintenance operation or during a simple stopover, by downloading a database of binary parameters, for example qualified according to the DO200 standard. The loading is performed in a simple manner without requiring recompilation of programs, the former parameters simply being overwritten with the new ones by ground/onboard file exchange, for example by FTP (File Transfer Protocol) or TFTP (Trivial File Transfer Protocol) protocol in the course of the centralized development updating activities or of the operation maintenance activities when the aircraft is immobilized at an airport gate.

Thus, the alerts and procedures management system can be adapted to a change in the operational need, for example because of a change in the component specifications or aircraft manufacturer's specifications, or because of a change in the operational conditions of use specific to an operator, such as the allocating of priority levels to tasks, the content of the procedures, the display style sheets or else the logic for executing the tasks and display on the MMI 15.

According to the invention, the whole set of operational needs of the alerts and procedures management system is grouped together in a configuration file 12. This configuration file 12 is converted by the parameterization tool 10 into a database of binary parameters 13. The generic software kernel 14 parameterized by means of the database 13 allows, aboard the aircraft, the management of the alerts in accordance with the operational needs expressed in the configuration file 12.

Accordingly, a configuration domain representative of the variability of the operational need of the electronic alerts and procedures management system is defined in a first phase of development of the flight management system. According to the invention, the configuration domain consists of a set of separate tasks; a separate task, for example an alert or a procedure to be executed, being described by values of parameters in a predetermined list. In a possible embodiment of the invention, the list of configurable parameters for each separate task comprises:

- the definition of the sounds of alerts: type of sound, duration, sound volume, repetitive nature;
- the definition of the flight phases: binary decision tree, with the flight phases and the logic of the decision nodes, definition of a validity of the flight phase, robust to a partial non-availability of the incomings of the various logic facilities of the decision nodes;
- the definition of the alerts: triggering event, means of visual and audio announcement, priority, text message, type of alert, inhibitory flight phases, inhibitory contexts, associated procedure;
- the definition of the triggering events: list of aircraft signals with their deformatting and consolidation law, sequential table of operations transforming the list of signals and contexts into a triggering event
- the definition of the aircraft signals: list of aircraft signals with their deformatting and consolidation law;
- the definition of the contexts: list of aircraft signals with their deformatting and consolidation law, sequential table of operations transforming the list of signals into a context;
- the definition of the procedures: title, type, position in the menu, list of attached procedures, list of auto-completed procedures, content of the procedure;
- the definition of the content of a procedure: composition in pages and items;
- the definition of an item: category, text content, graphical style, attached system page, auto-acknowledgement event;
- the definition of the menu: number of lines, definition of a sub-menu or of a procedure title.

For each of the parameters of the list, a range of values is permitted.

The aim of the configuration domain is to cover an extended spectrum of operational needs. To limit the effort of software development and associated certification, one seeks to cover for a configuration domain several aircraft types and the requirements of a large number of subsequent operators of the aircraft.

According to the invention, the configuration file 12 describes the operational need of the alerts and procedures management system by means of a set of parameters that is structured in accordance with the configuration domain. This marked-up textual parameter file can be established using a high-level language, such as XML (eXtended Mark-up Language).

As is described subsequently, the generic software kernel is designed so as to be able to be parameterized for a predetermined configuration domain, such as described hereinabove. Thus, when an update of the alerts and procedures management system is necessary, the new operational need is described by a configuration file in accordance with the configuration domain for which the generic kernel was initially developed. The conversion module transforms this configuration file into a database of binary parameters which is able to parameterize the generic software kernel. Advantageously, the list of parameters of the configuration domain and their permitted ranges of variation are configured so as to make it possible to cover an extended spectrum of operational need, with the aim of limiting the software development and certification activity to a generic software kernel.

Figure 3:
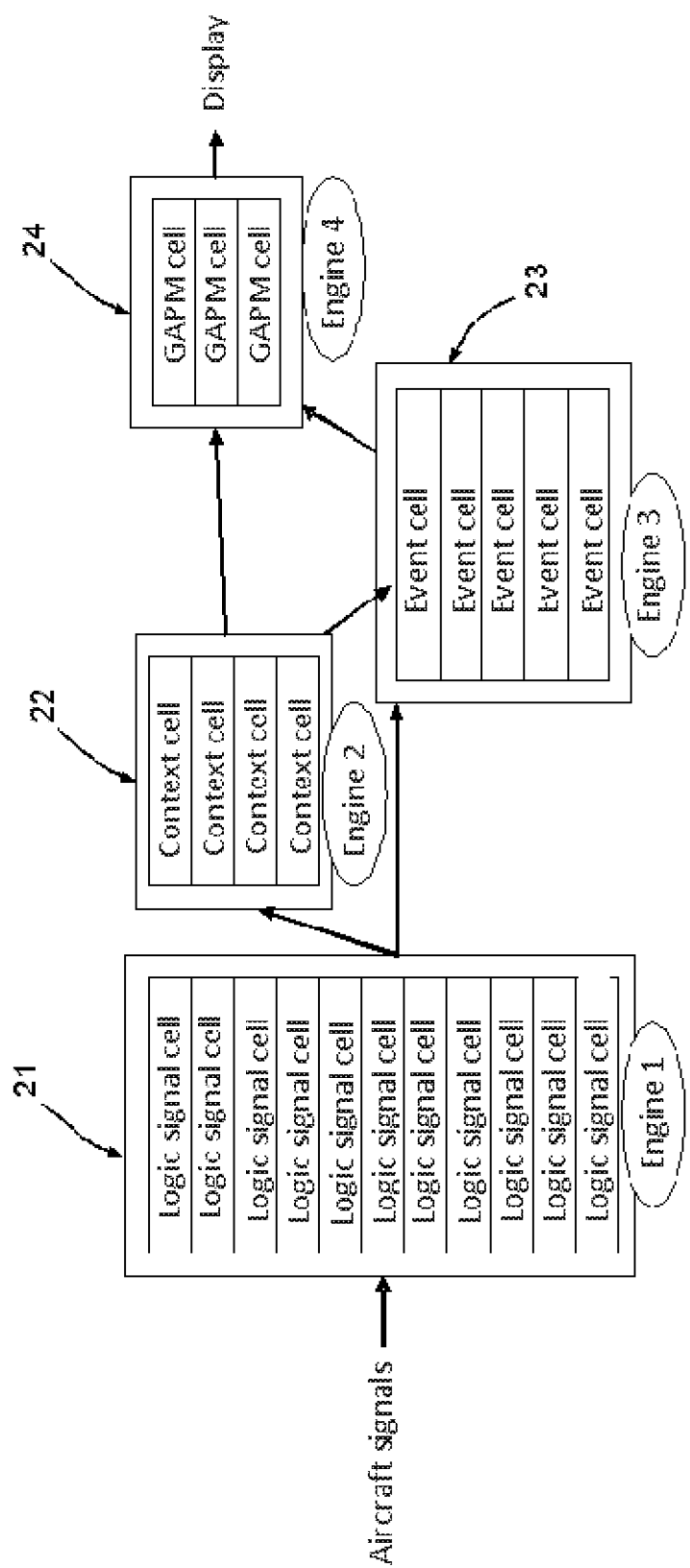
FIG. 3 represents an example of operational logic at the level of a task according to one embodiment of the invention.

FIG. 3 represents an exemplary functional architecture of the generic software kernel parameterizable according to the invention. The generic software kernel comprises four elementary cells:

- a first cell 21 for acquiring and consolidating a set of aircraft signals transmitted to the alerts and procedures management system of the FWS. It may involve intrinsic data (malfunction of a piece of electronic equipment or an engine, cabin pressures, altitude, speed, etc.) or extrinsic data (output of the anticollision system, output of the weather system, operator message, control message, etc.). It may also involve data modified by the crew in response to an alert so as to allow closed-loop validation of the execution of a procedure;
- a second cell 22 for characterizing a set of state variables of the aircraft, such as for example the state of an alert or the automatic acknowledgement of the item of a procedure in progress;

a third cell 23 for computing at least one separate event, such as an alert or a procedure, generated on the basis of the consolidated aircraft signals and/or of the state variables;

a fourth cell 24 for scheduling the separate events for communication with the crew. In practice it may involve a state machine able to store, prioritize or decide for a set of separate events for communication with the crew, for example through sound alerts or through the cockpit MMI.

As represented in FIG. 3, each elementary cell hosts a subset of configuration parameters for the database of binary parameters 13 and is driven by a generic software engine. The four software engines of the elementary cells constitute the invariant part of the generic software kernel. Each of the elementary cells has been validated separately for the whole set of configuration possibilities, that is to say for the set of possible values of the parameters of the configuration domain. The validation of the sequencing is facilitated by the nature of the interfaces between the cells which are exclusively boolean, limiting the combinatorics of cells assemblage tests, independently of the parameterization.

As represented in FIG. 3, the first acquisition and consolidation cell communicates a set of boolean signals to the second cell for the characterization of a set of state variables of the aircraft. The first cell and the second cell communicate a set of boolean signals to the third cell for the computation of at least one separate event. The second cell and the third cell communicates a set of boolean signals to the fourth cell for the scheduling of the separate events for communication with the crew.

The structuring of a predetermined configuration domain, and the splitting into four parameterizable elementary cells driven by four generic software engines according to the invention makes it possible advantageously to isolate the invariant parts of the alerts and procedures management system. It becomes possible to factorize the set of lines of code of the software. The invariant parts which depend for example on hardware configurations of components common to a set of aircraft or which depend on regulatory execution logic facilities are isolated from the parameterizable variable parts. The operational conditions of use specific to an operator, the allocating of separate event priority levels, the content of the procedures, the display style sheets as well as the logic for executing the tasks and display, notably, are processed as bundled parameters within a configuration file.

In a first phase of the development, a configuration domain is defined for a set of parameters representative of the variability of the operational need of various aircraft for the alert function. The generic software kernel, consisting of the four elementary cells, is designed and validated for this configuration domain. The certification of the generic software kernel, valid for the whole of the configuration domain, covers an extended spectrum of operational needs. It becomes possible to parallelize the development of the alerts and procedures management system with the aircraft's development tasks, it is also possible to upgrade the alerts and procedures management system through a simple parameterization operation.

The examples described hereinabove are given by way of illustration of embodiments of the invention. They do not in any way limit the field of the invention which is defined by the claims which follow.

The invention claimed is:

1. An alerts and procedures management system for an aircraft comprising:
a software kernel aboard the aircraft and a parameterization tool for the software kernel,
the parameterization tool comprising a conversion module, for converting a configuration file describing an operational need of the alerts and procedures management system into a database of binary parameters which is able to parameterize the software kernel,
the software kernel comprising at least four elementary cells:
a first cell for acquiring and consolidating a set of aircraft signals,
a second cell for characterizing a set of state variables of the aircraft, generated on the basis of the aircraft signals;
a third cell for computing at least one separate event, comprising at least one alert or one procedure, generated on the basis of the consolidated aircraft signals and/or of the state variables;
a fourth cell for scheduling the separate events for communication with the crew;
each of the cells comprising a software engine parameterizable by the database of binary parameters.

2. The alerts and procedures management system according to claim 1, wherein the configuration file describes an operational need by a set of parameters which is structured in accordance with a predetermined configuration domain, said configuration domain consisting of separate tasks, comprising at least one alert or one procedure, each separate task being described by values of parameters in a predetermined list comprising at least one parameter of the following type: alert, alert sound, flight phase, triggering event, aircraft signal, context, procedure, content of a procedure, item or menu; a permitted range of values being associated with each parameter.

3. The alerts and procedures management system for an aircraft according to claim 2, wherein the parameterization tool converts a configuration file coded in the XML language and complying with the configuration domain into a database of binary parameters which is able to parameterize each of the elementary cells of the software kernel.

4. The alerts and procedures management system for an aircraft according to claim 2, wherein the software engines of the four elementary cells are validated separately; the validation of a sequencing between the cells being facilitated by interfaces between boolean type cells, limiting the combinatorics of cells assemblage tests, independently of the parameterization.

5. A method for parameterizing an alerts and procedures management system for an aircraft according to claim 2, further comprising a first step of verifying the configuration domain of a configuration file representative of an operational need of the said alerts and procedures management system, and a second step of converting the configuration file into a database of binary parameters which is able to parameterize a generic alerts and procedures management system which is validated for the said configuration domain.

6. The method for developing an alerts and procedures management system for an aircraft according to claim 2, further comprising a step of defining a configuration domain for tasks to be executed, said configuration domain being able by parameterization to cover a wide spectrum of operational needs of the alerts and procedures management system, a step of programming the software engines of each of the elementary cells, and a step of parameterizing the logic for executing the tasks of each of the elementary cells.

7. The method for maintaining an alerts and procedures management system for an aircraft according to claim 2, further comprising a step of converting a configuration file describing an operational need of the alerts and procedures management system into a database of binary parameters, and a step of parameterizing the alerts and procedures management system by the database of binary parameters produced during a maintenance operation on the aircraft.

* * * * *